United States Patent
Yoon et al.

(10) Patent No.: US 8,972,134 B2
(45) Date of Patent: Mar. 3, 2015

(54) METHOD OF SEARCHING FOR TOUCH POINT OF CLUTCH

(71) Applicants: Hyundai Motor Company, Seoul (KR); Kia Motors Corp., Seoul (KR)

(72) Inventors: Young Min Yoon, Seoul (KR); Sung Hyun Cho, Suwon-si (KR); Joung Chul Kim, Suwon-si (KR); Seung Sam Baek, Jeju-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 0 days.

(21) Appl. No.: 13/798,848

(22) Filed: Mar. 13, 2013

(65) Prior Publication Data
US 2014/0136065 A1    May 15, 2014

(30) Foreign Application Priority Data

Nov. 9, 2012  (KR) ...................... 10-2012-0126586

(51) Int. Cl.
*G01M 13/02* (2006.01)
*F16D 48/06* (2006.01)

(52) U.S. Cl.
USPC ............................................. 701/67; 701/68

(58) Field of Classification Search
USPC ............................................. 701/67, 68, 51
See application file for complete search history.

(56) References Cited

U.S. PATENT DOCUMENTS

| | | | |
|---|---|---|---|
| 5,411,124 A | 5/1995 | Olson | |
| 6,086,514 A | 7/2000 | Jones et al. | |
| 6,490,944 B1 | 12/2002 | Heinzel et al. | |
| 6,711,486 B1 * | 3/2004 | Karlsson et al. | 701/67 |
| 8,260,510 B2 * | 9/2012 | Otsubo | 701/51 |
| 8,577,570 B2 | 11/2013 | Ellis | |
| 8,725,372 B2 | 5/2014 | Rinck et al. | |
| 2008/0305931 A1 | 12/2008 | Eich et al. | |
| 2011/0125378 A1 * | 5/2011 | Blessing et al. | 701/68 |

FOREIGN PATENT DOCUMENTS

| | | |
|---|---|---|
| JP | 2004-197842 A | 7/2004 |
| JP | 2011-202749 A | 10/2011 |
| KR | 2000-0035447 A | 6/2000 |
| KR | 2003-0044094 A | 6/2003 |
| KR | 10-2012-0046170 A | 5/2012 |
| WO | WO 2011-006466 A1 | 1/2011 |

OTHER PUBLICATIONS

U.S. Appl. No. 13/798,986, filed Mar. 13, 2013.*

* cited by examiner

*Primary Examiner* — Tan Q Nguyen
(74) *Attorney, Agent, or Firm* — Morgan, Lewis & Bockius LLP

(57) ABSTRACT

A method of searching for the touch point of a clutch includes a gear release determination step of determining whether the gear of a non-drive shaft has been released after a change of speed, a clutch operation step of, if the gear has been released, engaging a clutch connected to the non-drive shaft up to a current touch point, and a learning step of determining and learning the propriety of the current touch point depending on changes in the speed of the non-drive shaft after the clutch operation step.

4 Claims, 4 Drawing Sheets

METHOD OF SEARCHING FOR TOUCH POINT OF CLUTCH

CROSS-REFERENCE TO RELATED APPLICATION

The present application claims priority of Korean Patent Application Number 10-2012-0126586 filed Nov. 9, 2012, the entire contents of which application is incorporated herein for all purposes by this reference.

BACKGROUND OF INVENTION

1. Field of Invention

The present invention relates generally to a method of searching for the touch point of a clutch and, more particularly, to a technology that is capable of accurately maintaining the touch point of a dry clutch that is used in a double clutch transmission (DCT) that is mounted on a vehicle.

2. Description of Related Art

A DCT includes a clutch that is capable of automatically transmitting or blocking power using an actuator. When the clutch is a dry clutch, a touch point, that is, a point from which the clutch starts to operate, varies because of a change in the temperature of the clutch or the abrasion of the clutch, and thus it is necessary to appropriately adjust the touch point in order to maintain the reliable operability of the clutch.

FIG. 1 is a graph showing clutch torque characteristics for the strokes of a clutch actuator. When a stroke increases and then encounters a touch point, clutch torque actually starts to increase. If a clutch is in a normal state, the state in which the maximum clutch torque that is designed to be higher than the maximum engine torque that can be transmitted by an engine at the maximum stroke can be transmitted is entered. In contrast, if the touch point is moved because of a change in the temperature of the clutch or the abrasion of the clutch, the maximum torque of an engine is not sufficiently transmitted in the case of the maximum stroke.

As described above, the touch point is a factor that is related to the continuous and stable maintenance of the relationship of control between the clutch actuator and the clutch. FIG. 2 illustrates a conventional method of searching for and setting the touch point of a clutch. This method is performed when a vehicle is stopped or when a gearbox is in a neutral state immediately after the cranking of an engine.

That is, in the conventional method, the clutch actuator is manipulated from a location where the clutch is not engaged toward a location where the clutch is disengaged ("A"), the location of a clutch actuator from which the clutch starts to be rotated ("B") is determined to be a touch point, this location is set as a new touch point ("C"), and the clutch actuator is manipulated based on the newly set touch point.

However, the above-described conventional method is problematic in that changes in the characteristics of the touch point that occur while a vehicle is being driven cannot be taken into consideration because the touch point can only be learned while a vehicle is stopped.

The above description of the technologies is merely provided to help understand the background of the present invention. However, the above description of the technologies should not be construed as admitting that those technologies correspond to prior art that has been known to those having ordinary knowledge in the technical field.

SUMMARY OF INVENTION

Accordingly, the present invention has been made keeping in mind the above problems occurring in the prior art.

Various aspects of the present invention provide for a method of searching for the touch point of a clutch, which enables a touch point to be searched for while a vehicle is being driven, and thus a touch point appropriate for a change in the characteristic of the clutch can be acquired, with the result that the smooth and accurate operability of a clutch is achieved, thereby improving the sensation of a change of speed and the durability of the clutch.

Various aspects of the present invention provide for a method of searching for the touch point of a clutch, including a gear release determination step of determining whether the gear of a non-drive shaft has been released after a change of speed; a clutch operation step of, if the gear has been released, engaging a clutch connected to the non-drive shaft up to a current touch point; and a learning step of determining and learning the propriety of the current touch point depending on changes in the speed of the non-drive shaft after the clutch operation step.

At the learning step, a first range in which the rotation speed of the non-drive shaft is higher than engine speed and a second range in which rotation speed of the non-drive shaft is lower than the engine speed may be identified, and touch points may be learned using different methods for the respective ranges.

In the first range, if the deceleration of the non-drive shaft is higher than a predetermined reference value, a current touch point may be determined to have been excessively moved forward, and thus the touch point may be moved backward; and, if the deceleration of the non-drive shaft is not higher than the predetermined reference value, the current touch point may be maintained without change.

In the second range, if an inflection point occurs in the speed of the non-drive shaft, a location where the inflection point has occurred may be determined to be a new touch point and then learned.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
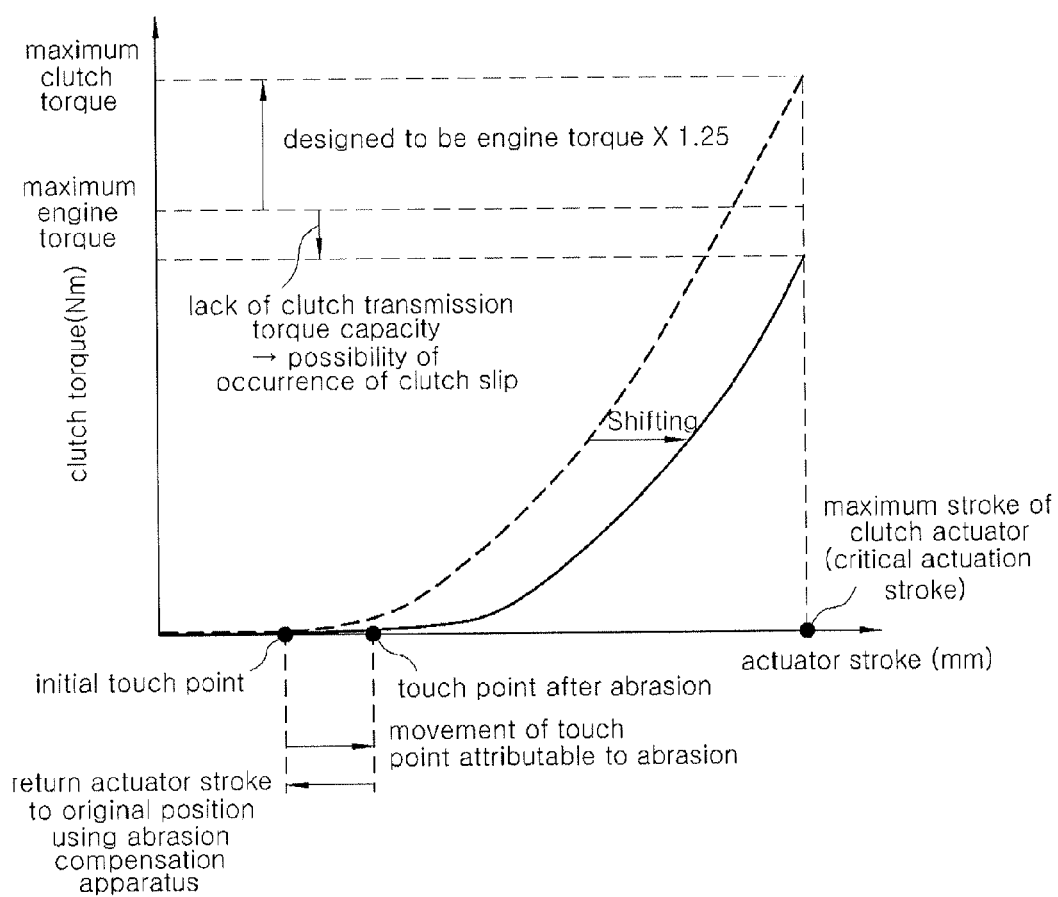
FIG. 1 is a graph showing clutch torques for the strokes of a conventional clutch actuator, which illustrates a touch point.
Figure 2:
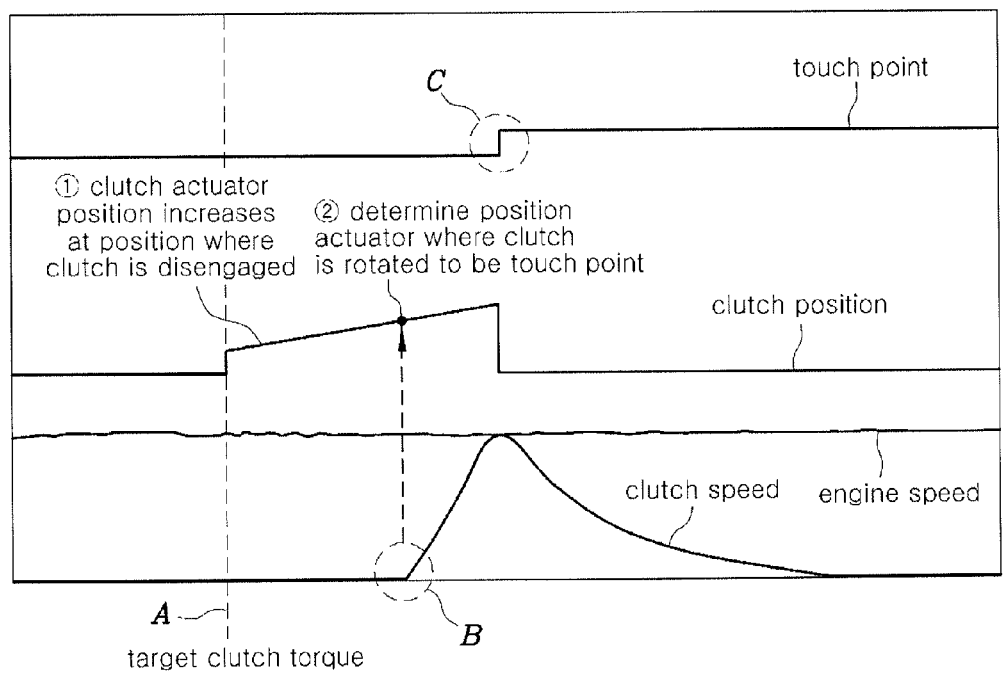
FIG. 2 is a graph illustrating a conventional method of searching for the touch point of a clutch.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Reference now should be made to the drawings, throughout which the same reference numerals are used to designate the same or similar components.

Figure 3:
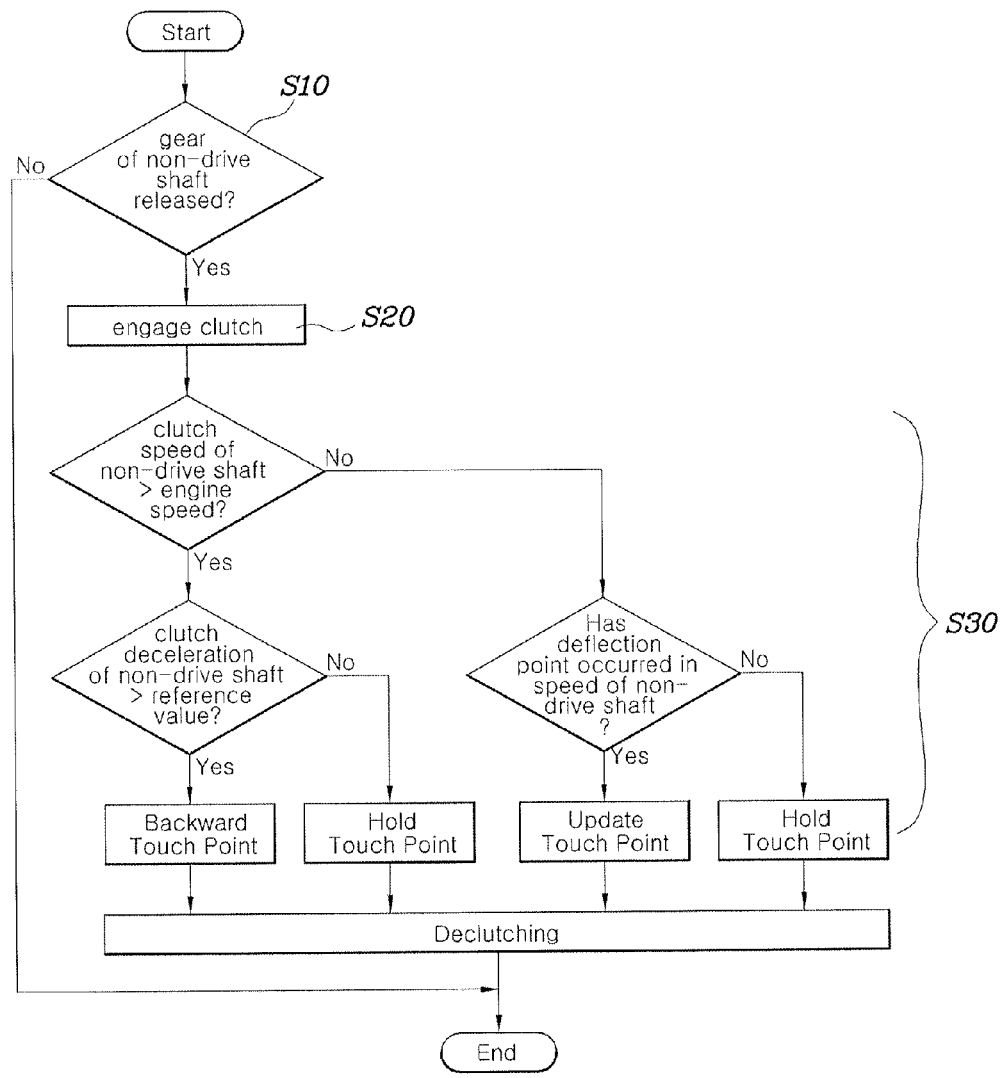
FIG. 3 is a flowchart showing an exemplary method of searching for the touch point of an exemplary clutch according to the present invention.
Figure 4:
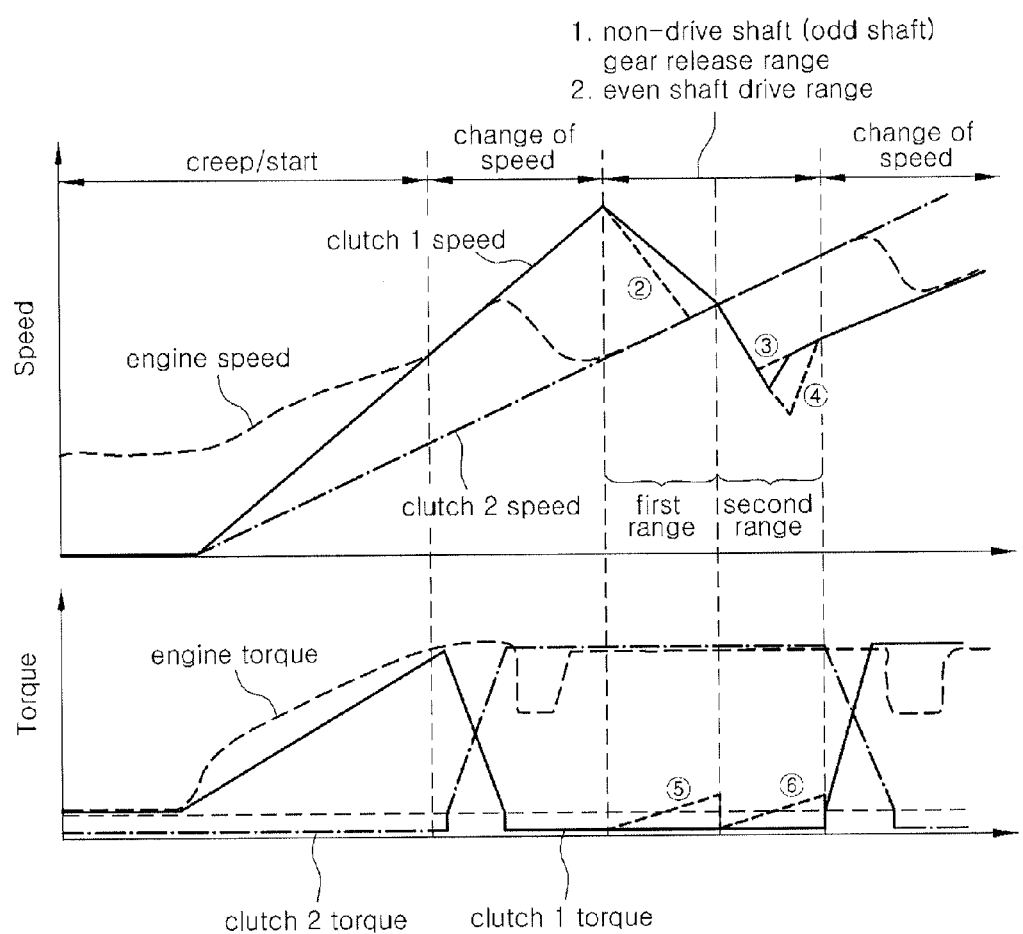
FIG. 4 is a diagram illustrating the exemplary method of searching for the touch point of an exemplary clutch according to the present invention over time.

Referring to FIGS. 3 and 4, a method of searching for the touch point of a clutch in accordance with various embodiments of the present invention includes gear release determination step S10 of determining whether the gear of a non-drive shaft has been released after a change of speed; clutch operation step S20 of, if the gear has been released, engaging a clutch connected to the non-drive shaft up to a current touch point; and learning step S30 of determining and learning the propriety of the current touch point depending on changes in the speed of the non-drive shaft after clutch operation step S20.

That is, when an input shaft that has acted as a drive shaft that forms a shift stage in a DCT becomes a non-drive shaft after a change of speed has been completed and the rotation speed of the non-drive shaft decreases as a shift gear releases, clutch operation step S20 is performed. Then, based on changes in the rotation speed of the non-drive shaft that occur after the clutch connected to the non-drive shaft has been manipulated to a currently set touch point, the propriety of the current touch point is determined and also the current touch point is learned. Accordingly, the touch point can be learned even while the vehicle is being driven, and thus an optimal touch point is always acquired, with the result that the smooth and reliable operability of the corresponding clutch is achieved, thereby improving the sensation of a change of speed and the durability of the clutch.

At learning step S30, a first range in which the rotation speed of the non-drive shaft is higher than engine speed and a second range in which the rotation speed of the non-drive shaft is lower than engine speed are identified, and touch points are learned using different methods for the respective ranges.

In the first range, if the deceleration of the non-drive shaft is higher than a predetermined reference value, a current touch point is determined to have been excessively moved forward, and thus the touch point is moved backward. In contrast, if the deceleration of the non-drive shaft is not higher than the predetermined reference value, the current touch point is maintained without change.

That is, in the first range, the rotation speed of the non-drive shaft is higher than the engine speed. In this state, if the current touch point has been moved forward up to a location where a clutch is excessively engaged, the rotation speed of the non-drive shaft will decrease with a steeper slope than in a disengagement state in which the clutch is not manipulated to the touch point. In this case, learning is performed such that the touch point is moved backward to a position where the clutch is disengaged.

Referring to FIG. 4, the above-described situation will be described in greater detail. In the first range, the speed of clutch 1 is substantially the speed of the non-drive shaft that is an input shaft to which clutch 1 has been connected. The situation that is indicated by a solid line in the first range as a gear is released represents a common situation in which speed decreases after clutch 1 has been disengaged. Dotted line □ indicates a situation in which when clutch 1 has been moved to a current touch point by clutch operation step S20 as indicated by □, the speed of the non-drive shaft decreases. Since the dotted line descends more steeply than the solid line, the current touch point has been moved forward further, and thus the current touch point should be moved backward and set to a new touch point.

Accordingly, the predetermined reference value may be set such that the speed of clutch 1 of the first range of FIG. 4 decreases with a slope indicated by a solid line or such that an appropriate margin is provided with respect to the slope.

In the second range, if an inflection point occurs in the speed of the non-drive shaft, a location where the inflection point has occurred is determined to be a new touch point and then learned. In contrast, if an inflection point does not occur, a current state is maintained.

That is, if inflection points occur as indicated by □ and □ in FIG. 4 when the clutch is manipulated to the touch point as indicated by □ in FIG. 4, it means that the power of the engine is transmitted via the clutch at the points and the speed of the non-drive shaft increases after decreasing. Accordingly, theses points may be determined to be actual touch points, and may be learned and set as new touch points.

As described above, the present invention enables a touch point to be learned in a situation in which a change of speed has been completed while a vehicle is being driven, and thus the appropriate touch point of a clutch is acquired, with the result that the optimum manipulation of the clutch can be achieved, thereby improving the sensation of a change of speed and the durability of the clutch.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of searching for a touch point of a clutch, comprising:
   a gear release determination step of determining whether a gear of a non-drive shaft has been released after a change of speed;
   a clutch operation step of engaging a clutch connected to the non-drive shaft up to a current touch point, if the gear has been released; and
   a learning step of determining and learning propriety of the current touch point depending on changes in speed of the non-drive shaft after the clutch operation step.

2. The method of claim 1, wherein at the learning step, a first range in which rotation speed of the non-drive shaft is higher than engine speed and a second range in which rotation speed of the non-drive shaft is lower than the engine speed are identified, and touch points are learned using different methods for the respective ranges.

3. The method of claim 2, wherein in the first range, if the deceleration of the non-drive shaft is higher than a predetermined reference value, a current touch point is determined to have been excessively moved forward, and thus the touch point is moved backward; and, if the deceleration of the non-drive shaft is not higher than the predetermined reference value, the current touch point is maintained without change.

4. The method of claim 2, wherein in the second range, if an inflection point occurs in the speed of the non-drive shaft, a location where the inflection point has occurred is determined to be a new touch point and then learned.

* * * * *